(12) United States Patent
Schweninger

(10) Patent No.: US 9,641,244 B2
(45) Date of Patent: May 2, 2017

(54) COMPENSATION FOR AN OPTICAL SENSOR VIA A PRINTED CIRCUIT BOARD

(71) Applicant: Mechaless Systems GmbH, Bruchsal (DE)

(72) Inventor: Erhard Schweninger, Karlsruhe (DE)

(73) Assignee: Mechaless Systems GmbH, Bruchsal (DE)

( * ) Notice: Subject to any disclaimer, the term of this patent is extended or adjusted under 35 U.S.C. 154(b) by 62 days.

(21) Appl. No.: 14/449,773

(22) Filed: Aug. 1, 2014

(65) Prior Publication Data

US 2014/0341567 A1 Nov. 20, 2014

Related U.S. Application Data

(63) Continuation of application No. PCT/EP2012/076608, filed on Dec. 21, 2012.

(30) Foreign Application Priority Data

Feb. 3, 2012 (EP) .................................... 12153874
Oct. 5, 2012 (EP) .................................... 12187398

(51) Int. Cl.
*G01N 21/55* (2014.01)
*H04B 10/073* (2013.01)
(Continued)

(52) U.S. Cl.
CPC .......... *H04B 10/073* (2013.01); *G01S 7/4811* (2013.01); *G01S 7/4813* (2013.01);
(Continued)

(58) Field of Classification Search
CPC ............... G01N 21/3151; G01N 21/49; G01N 21/6452; H04B 10/073; H04B 10/2575;
(Continued)

(56) References Cited

U.S. PATENT DOCUMENTS 5,311,660 A * 5/1994 Alpaugh .............. H05K 3/0055
                                                134/28
5,666,037 A 9/1997 Reime
(Continued)

FOREIGN PATENT DOCUMENTS

CN      1688912 A     10/2005
DE   100 01 955 A1    7/2001
(Continued)

OTHER PUBLICATIONS

English Translation of International Preliminary Patent Report on Patentability and Written Opinion of the International Searching Authority, PCT/EP2012/076608, Aug. 14, 2014.

*Primary Examiner* — Hina F Ayub
(74) *Attorney, Agent, or Firm* — Bose McKinney & Evans LLP

(57) ABSTRACT

Opto-electronic measuring arrangement which is largely independent of extraneous light, comprising emitted and compensation light sources, which emit light time-sequentially and in a phased manner, wherein the emitted light is phase-shifted respectively by 180°. An optical receiver receives the light emitted by the emitted light source and reflected by the object being measured together with the light from the compensation light source. The actuation signals for the emitted and compensation light sources are controlled such that the synchronous signal difference occurring in the receiver between the different phases is reduced to zero. The optical coupling between the compensation light source and the receiver diode occurs mainly via an optical system in a printed circuit board on which the compensation light source and the receiver are arranged. The printed circuit board itself, i.e. the FR4 component thereof, may constitute the optical conductor between the compensation light source and receiver diode.

25 Claims, 5 Drawing Sheets

(51) Int. Cl.
*G01S 17/02* (2006.01)
*G01S 7/497* (2006.01)
*G01V 8/20* (2006.01)
*H04B 10/2575* (2013.01)
*G01S 7/481* (2006.01)

(52) U.S. Cl.
CPC ............ *G01S 7/497* (2013.01); *G01S 17/026* (2013.01); *G01V 8/20* (2013.01); *H04B 10/2575* (2013.01)

(58) Field of Classification Search
CPC ...... G01S 7/4811; G01S 7/4813; G01S 7/497; G01S 17/026; G01V 8/20
USPC .......................................... 356/400–447, 45
See application file for complete search history.

(56) References Cited

U.S. PATENT DOCUMENTS

| | | | | |
|---|---|---|---|---|
| 5,708,116 | A * | 1/1998 | Griffith | C08G 77/385 528/15 |
| 7,589,303 | B2 * | 9/2009 | Reime | G01V 8/20 250/205 |
| 8,371,871 | B1 * | 2/2013 | Murphy | H01R 12/585 439/444 |
| 2003/0020004 | A1 | 1/2003 | Reime | |
| 2003/0161119 | A1 * | 8/2003 | Szu | H01L 23/4093 361/760 |
| 2004/0258345 | A1 | 12/2004 | Griese et al. | |
| 2005/0092900 | A1 | 5/2005 | Reime et al. | |
| 2005/0094922 | A1 * | 5/2005 | Ha | G02B 6/1221 385/14 |
| 2006/0056765 | A1 * | 3/2006 | Hwang | G02B 6/43 385/39 |
| 2007/0250006 | A1 * | 10/2007 | Court | A61B 5/064 604/117 |
| 2008/0042043 | A1 | 2/2008 | Reime et al. | |
| 2008/0204700 | A1 | 8/2008 | Reime | |
| 2008/0296051 | A1 * | 12/2008 | Yamaguchi | H05K 1/118 174/257 |
| 2008/0299840 | A1 * | 12/2008 | Kitamuki | H01R 13/41 439/884 |
| 2011/0175702 | A1 * | 7/2011 | Desnoyers | G06K 9/0002 340/5.82 |
| 2011/0211188 | A1 * | 9/2011 | Juenemann | G01S 7/4811 356/4.01 |
| 2013/0033671 | A1 * | 2/2013 | Schadt | C09K 19/3809 356/326 |
| 2013/0181613 | A1 | 7/2013 | Schweninger | |

FOREIGN PATENT DOCUMENTS

| | | |
|---|---|---|
| DE | 102 11 307 A1 | 11/2003 |
| DE | 103 00 223 B3 | 6/2004 |
| DE | 103 22 552 A1 | 12/2004 |
| DE | 10 2005 045 933 A1 | 2/2007 |
| EP | 0 706 648 B1 | 9/1997 |
| EP | 1 671 160 B1 | 5/2007 |
| EP | 2 418 512 A1 | 2/2012 |
| WO | WO 01/54276 A1 | 7/2001 |
| WO | WO 2012/013757 A1 | 2/2012 |

* cited by examiner

COMPENSATION FOR AN OPTICAL SENSOR VIA A PRINTED CIRCUIT BOARD

RELATED APPLICATIONS

This application is a continuation of PCT/EP2012/076608, filed Dec. 21, 2012, which claims priority to EP 12 153 874.8, filed Feb. 3, 2012, and also claims priority to EP 12 187 398.8, filed Oct. 5, 2012, each of which aforementioned application is hereby incorporated herein by reference in its entirety.

BACKGROUND

The present invention relates to an opto-electronic measuring arrangement comprising an optical transmitter, an optical compensation transmitter and an optical receiver for measuring the transmission properties of a first transmission path between the transmitter and the receiver.

An opto-electronic measuring arrangement of this kind works according to the HALIOS principle developed by ELMOS AG. This measuring principle is known in the prior art and is described in the following documents, among others: U.S. Pat. No. 5,666,037; EP 0 706 648 B1; EP 1 671 160 B1; DE 100 01 955 A1; EP 2 418 512 A1.

The measuring arrangement, also designated hereafter as "sensor," comprises an emitted light source also designated hereafter as "transmitter, emitter," and a compensation light source, also designated hereafter as "compensator," wherein each light source is energized, preferably in alternating manner, by its own current driver and emits light (usually in the IR spectrum) in the emitting phase or the compensation phase. For this purpose, a clock generator actuates the current driver with clock signals that are preferably phase-shifted through 180° with respect to one another. The frequency may be in the range from a few kHz to several tens of MHz.

An optical receiver receives a part of the light emitted by the two light sources with a photodiode, also designated hereafter as "PD," and converts it into current alternating signals (AC), which—after separation of the DC and low-frequency signal components (generally originating from the ambient light)—are passed via a high-pass function (e.g., a capacitor) to a transimpedance amplifier (TIA). The transimpedance amplifier converts said current signals into voltage. These voltages are assigned to the emitting and compensation phases in a synchronous demodulator, again in alternating manner, and forwarded to a controller that is tasked with generating identical amplitudes for the two temporally consecutive signal components. To do this, the controller controls the amplitudes of the currents correspondingly through the compensator and the transmitter. Depending on the application, only the amplitude of the compensator current can be controlled with a constant transmitter current amplitude, or conversely only the amplitude of the transmitter current with a constant compensator current amplitude. The amplitudes of the compensator current are usually in the range of a very few mA. However, depending on the application, the emitter current amplitudes can be in the range from a few mA to several hundred mA.

The light radiated by the transmitter into the area around the sensor reaches the object being measured (detected) outside of the sensor. The object reflects a fraction of the light that reaches the object back to the photodiode of the sensor. The ratio derived from the received current in the photodiode and the transmitter (emitter) current used therefor is the optical coupling factor of the path from the transmitter via the measured object to the photodiode (emitter-measured object-photodiode path). The sensor determines the optical coupling factor and reproduces it in the sensor's controller adjustment signal.

The compensator (compensation light source) is constructed in such a manner that the light emitted thereby is not able to reach the measured object, but is directed to the photodiode inside the sensor instead. For this purpose, a waveguide or other optical guide is usually installed inside the sensor and guides the light from the compensator (directly) to the receiver, usually a photodiode. In practical application, the light component emitted by the compensator is set to a predefined dimension so that only a certain (usually smaller) fraction of the emitted light reaches the photodiode of the sensor during the compensation phase. The ratio between the current generated from this light fraction in the photodiode and the compensation current used therefor is the optical coupling factor of the compensator-photodiode path. This is constant, since the light emitted by the compensator essentially does not reach the measured object. Thus, the compensation signal represents an immutable parameter or a reference for the measurement.

Of course, other signals may also be used besides the temporally sequential signals described here, provided they are capable of generating feedback controlled compensation for the receiver output signal.

SUMMARY

This disclosure teaches an optimized yet inexpensive measuring arrangement that functions according to a compensation principle, in particular the HALIOS compensation principle. The design of the measuring arrangement is simple and compact.

This sensor system, which functions largely independently of extraneous light, comprises a transmitter (emitter), a compensation transmitter (emitter) and a receiver. The receiver is able to receive a signal emitted by the light source and a compensation signal emitted by the compensator and overlaid linearly thereon, and to generate a receiver output signal. The light source sends an emitted light signal to the receiver over a first transmission path, of which the transmission properties are to be determined. The compensation signal reaches the receiver after traversing a second transmission path. The receiver may also comprise at least one receiver diode or photodiode. It may also be a receiver unit which is also equipped with a capacitor and/or amplifier, for example. Other designs for a receiver are also possible.

In one technical configuration, a sensor system of such kind preferably comprises one emitted light source and one compensation light source, which emit light time-sequentially and in a phased manner. The emitted light from the two sources is phase-shifted, preferably by 180°. An optical receiver with a photodiode for receiving light that contains a synchronous measuring signal emitted by the light sources is part of the sensor system, as is a clock generator that generates a clock signal, and an amplifier unit for amplifying a measuring signal current based on the received measuring signal. The measuring signal current is evaluated synchronously by a demodulator. A controllable current source generates a clocked emission control current for the emitted light source. A controllable compensation current source generates a clocked compensation control current for the compensation light source.

From the receiver output signal, a control unit of the opto-electronic measuring device according to this disclosure generates a compensation control signal for actuating the compensation light source and/or an emission control signal for actuating the emitter for feedback-related control of the receiver output signal. The control is assured in such a manner that if there is a change in the transmission properties of the first transmission path the receiver output signal remains essentially unaltered, that is to say that after a short time (usually after a few microseconds or milliseconds, for example not more than 100 µsec, preferably not more than 10 µsec), it is restored to the value that was set before the transmission properties changed. A change in transmission properties may be caused for example by movement of an object in the transmission path.

The control unit can typically generate at least one actuation signal for the controllable emitted light source and/or the compensation light source. It is preferably designed in such a manner that the light intensity of the emitted light source for controlling the emission control current and/or of the compensation light source for controlling the compensation control current is/are adjustable. With regard to the light intensity, the amplitude is preferably controlled in such manner that there is no longer a difference between them. The adjustment can also be effected in such a manner that the clock-synchronous signal differential between the differing phases becomes zero.

In the context of this disclosure, a general question was also raised regarding an inexpensive, compact sensor construction, particularly a compensator construction involving as little hardware and assembly effort as possible. It was realized that the dedicated fiber optics for the compensator coupling used in many application cases, particularly in compact circuit arrangements, up until the time of this disclosure, is dispensable, or replaceable as described here. The known, separate fiber optics are difficult to install, because an adequate optical coupling is needed, they are sensitive to mechanical loads, and entail additional costs. Of course, a dedicated waveguide can be provided in the case of special applications.

Compensation methods such as the HALIOS method require a compensation signal, which is preferably generated and controlled in the compensation LED in such a manner that it is exactly the same size as the light signal that is emitted by the transmitter and then transmitted (reflected) from a measured object to the receiver (e.g., photodiode or receiver diode). In practical application, the receiver, compensation light source and emitted light source components are often arranged on or in a printed circuit board (PCB).

According to this disclosure, the coupling between the compensation light source (compensation transmitter) and the receiver is such that it is assured at least in part by an optical system in the printed circuit board. The compensation light source and the receiver are each arranged on the printed circuit board. The compensation light source can be arranged on the printed circuit board or on one of the sides thereof. For the purposes of this disclosure, an optical system in the printed circuit board is an arrangement in the printed circuit board that forwards and thus transports, optical emissions, e.g., light (visible or invisible), in the printed circuit board. It may be for example a glass fiber in the printed circuit board, a channel in the printed circuit board, or a similar structure.

The receiver is preferably also arranged on an external side of the printed circuit board. It may also be positioned in a hole in the printed circuit board, or protrude partly into a hole, particularly a through-hole. The receiver may be a receiver diode or a photodiode, for example.

Consequently, this disclosure does without a separate (external) optical fiber to transmit the light from the compensator to the receiver. Instead, the (necessary) compensation light is guided from the compensation LED to the photodiode through an optical system inside the printed circuit board. The optical system is preferably a compensating optical fiber system. For example, it may comprise channels or holes within the printed circuit board, or an integrated waveguide. Optionally, the printed circuit board may have optical or mechanical structures in the interior thereof, such as recessed, preferably metallic meshes or metallizations, interlayer connections, which are usually in the form of through holes with a metal coating, slots or channels, with or without metal coating, or other optically opaque or partly opaque coatings, wherein the optical opacity relates to light in the visible and invisible (e.g., infrared) range.

In one embodiment, the optical system is the printed circuit board (PCB) itself. The PCB does not need to be modified or prepared for this. Thus, a separate fiber optic system is not needed because the printed circuit board is used to transmit the light from the compensator to the receiver. The optical signal is forwarded to the photodiode at least partly, preferably mostly, particularly preferably exclusively, that is to say only via the printed circuit board. "Mostly" means that at least 70% of the light emitted by the compensator (compensator emission) is guided to the receiver via the optical system. Preferably, at least 80%, most preferably at least 90% of the light emitted by the compensator is guided to the receiver via the optical system. In some embodiments and in certain printed circuit boards or optical channels, at least 95% of the compensator emission received in the receiver (e.g., light or IR radiation) is guided via the optical system or inside the printed circuit board, preferably at least 98%, particularly preferably at least 99%. But the optical system may also be a predefined (limited) area or part of a printed circuit board or, for example, a layer of a printed circuit board.

Since the printed circuit board consists of glass fibers and bonding agents, it lends itself well for use as an optical system and for the optical guidance of light in the visible and non-visible range. It is preferably made from polymer reinforced with glass fiber, very preferably epoxy resin reinforced with glass fiber. FR4 material is particularly preferred. In addition and/or alternatively to the preceding, mechanical structures in the printed circuit board may support the optical system (printed circuit board).

A conductor board or printed circuit board contains a mixture of glass fiber elements, with the result that the light transported in the printed circuit board is damped and scattered. The printed circuit board is therefore very suitable for use as a light conductor for the compensation light signal, because in this case damping of the signal is desired. The emitter signal that is reflected from a measured object to the receiver is smaller than the signal that is transported directly from the compensator to the receiver with the same control or supply signals. Damping by the printed circuit board thus lowers the signal level of the compensator signal so that the control circuit (compensation) can be controlled more quickly, more certainly and more accurately.

Since the system is very tolerant with regard to deviations in the coupling between the compensator and the receiver (PD), tolerances of 50% and more can be accepted in this regard in many application cases. Any greater deviations in the printed circuit board material, e.g., the FR4 material, relating to a given batch or manufacturer may be adjusted readily, and thus inexpensively, by means of extra electronic functions (e.g., current mirror, resistors) integrated in the IC or discretely arranged. Moreover, the actual optical compensator coupling can easily be determined at any time directly in the loaded circuit by carrying out an oscilloscope measurement in any test mode suitable for this purpose.

In one embodiment, the compensation light source is at least partly integrated in the printed circuit board. In another embodiment, the compensation light source is fully integrated in the printed circuit board. For example, the compensation light source can be arranged in a blind hole. In a multilayer printed circuit board, it is preferably positioned in one of the inner layers. With this arrangement, at least one of the inner layers can be coated with a light-impermeable layer, a metallisation for example. The light-impermeable layer prevents emitted radiation from reaching a measured object. The radiation emitted by the compensation light source then reaches the receiver, and preferably does not escape from the printed circuit board, at least not to such an extent that the radiation is reflected by a measured object and only then transmitted back to the receiver.

In a multilayer printed circuit board with a compensation light source embedded in one of the inner layers, the inner layers of the printed circuit board between the compensation light source and the receiver (e.g., the receiver diode or photodiode) are preferably not metallized or coated with other light-impermeable layers. Thus for example, an optical coupling between the compensation light source and the receiver is assured.

Alternatively, the compensation light source may also be assembled on the printed circuit board in a "reverse assembly" arrangement. A coat applied to the outside of the printed circuit board, typically a copper layer, then has a slot through which the compensation light source can radiate into the circuit board material. Alternatively, a blind hole, a through hole or similar may be provided to enable better coupling of the compensation light signal with the printed circuit board material. It is possible that such a blind hole may be at least partly coated so that the light radiated by the compensation light source may be guided accordingly. The compensation light source may protrude into such a hole.

In a further embodiment, the emitter (e.g., LED) and/or the receiver (e.g., receiver diode) are mounted on the printed circuit board in reverse assembly. The emitter then sends its emitted light out through an emitter through-hole in the printed circuit board, so that the light can be emitted through the printed circuit board.

The emitter through-hole typically also has an opening angle, which may be in the same ranges as the opening angle of the through-hole of the receiver. However the opening angle of the emitter through-hole may also have an angle greater than 120 degrees, for example up to about 150 degrees or 160 degrees. Angles between 80 and 150 degrees are preferred, 90 to 120 degrees are particularly preferred. The emitter through-hole is preferably coated, particularly metallized, on the inside, so that it is opaque, at least for the emitted radiation. For example, a layer of metal or copper can be provided on the inside of the hole.

When constructing printed circuit boards in electronics engineering, frequent use is made of uncoated and coated through-holes. They are known from the prior art and can be produced easily and inexpensively. Such through-holes are also known as vias and can be used for both the emitters and the receivers to enable the opto-electronic measuring arrangement to be produced inexpensively.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
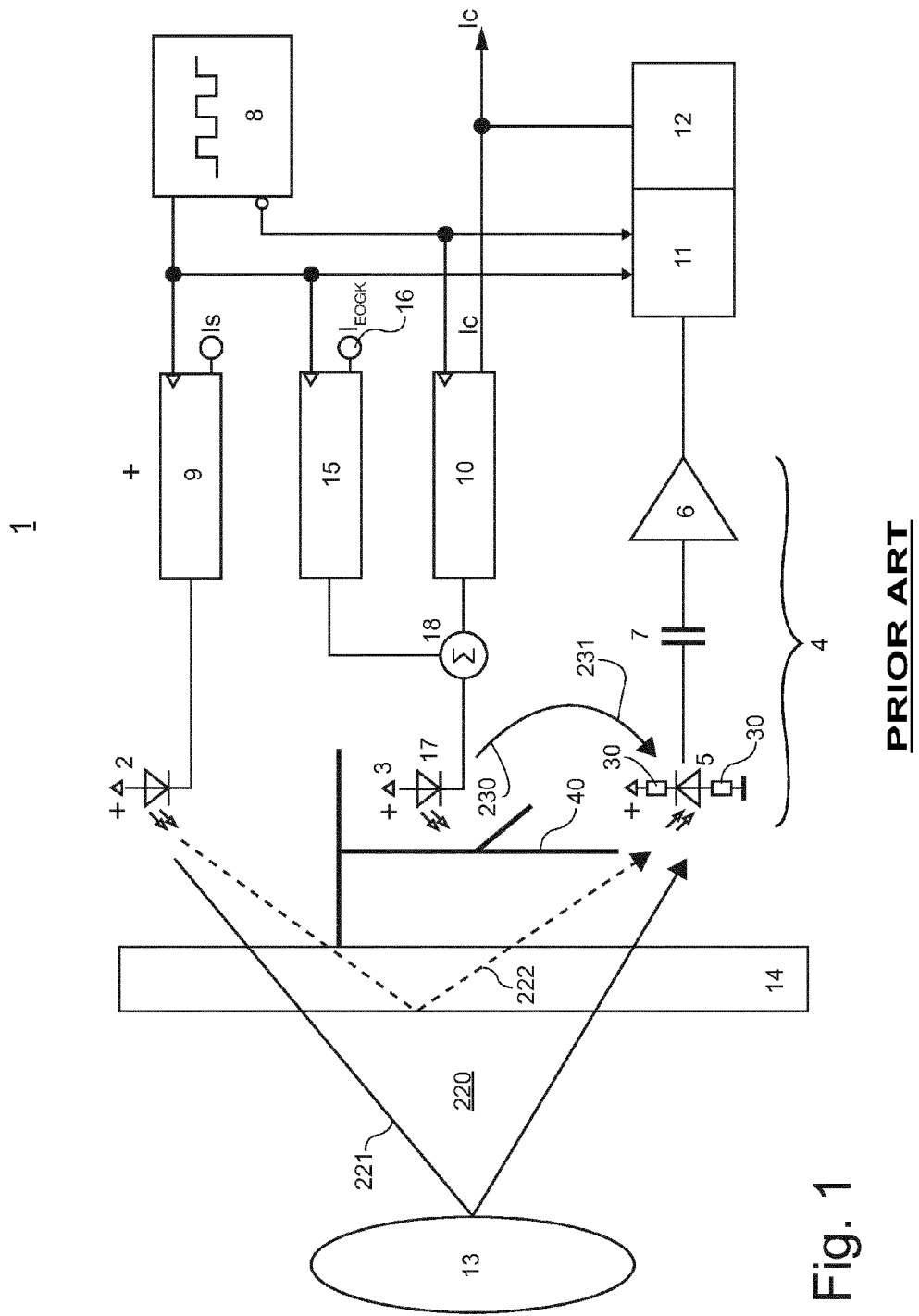
FIG. 1 shows a schematic of a Halios sensor with electro-optical basis coupling as known from the prior art.

FIG. 1 shows the principle of an opto-electronic measuring arrangement 1 according to the prior art, with extraneous light compensation. Measuring arrangement 1 comprises an emitted light source 2 (emitter), a compensation light source 3 (compensator) and an optical receiver unit 4, which includes a photodiode 5, a gyrator 30 (for draining low-frequency current components in the photodiode), a transimpedance amplifier 6 and a capacitor 7. A clock generator 8 provides a clock signal for a controllable current source 9, which supplies emitted light source 2. At the same time, clock generator 8 delivers an inverted clock signal to a controllable compensation current source 10, which supplies compensation light source 3. The clock signal and the inverted clock signal are fed to a demodulator 11 to enable synchronous evaluation of the useful signal current generated by optical receiver unit 4 on the basis of the received light signal.

A controller unit 12 generates an actuation signal for controllable compensation current source 10, so that preferably compensation light source 3 may be controlled in such a manner that the synchronous useful signal current occurring between different phases in receiver unit 4 becomes zero. In this context, the useful signal current is based on the light components radiated by emitted light source 2 and compensation light source 3.

Emitted light source 2 sends a transmitted signal in the form of visible or invisible light (radiation) into a first transmission path 220, and the light is received by receiver unit 4 after passing through transmission path 220. If a measured object 13 is located close to measuring arrangement 1 (before the (light-) permeable sensor cover 14), light radiated by emitted light source 2 is reflected at measured object 13 and sent back to photodiode 5. A functional coupling 221 is established by measured object 13.

Without a shield 40, a signal component would pass from emitted light source 2 directly to photodiode 5. The signal component represents the optical basis coupling 222 (shown as dashed line) of transmitter 2. Shield 40 prevents optical basis coupling 222. In the embodiment shown according to FIG. 1, it is generated by a controllable basis coupling current source 15 and consequently designated electro-optical basis coupling (EOBC) 231. Basis coupling current source 15 is clocked with the clock signal of clock generator 8 and supplied by a signal generator 16, the "basis coupling signal generator". The generated basis coupling control current is fed to basis coupling light source 17, which transmits light to photodiode 5 via a second transmission path 230. In the embodiment shown here, basis coupling light source 17 is the compensation light source 3 itself. It is connected in such a manner that it alternately emits synchronous light signal components of both the compensation phase and in the electro-optical basis coupling. The phase of the basis coupling light source 17 is offset, preferably by 180 degrees, relative to the phase of the compensation light source 3, which is supplied by compensation current source 10. It corresponds to the phase of emitted light source 2.

Since basis coupling light source 17 and compensation light source 3 are the same component, compensation light source 3 therefore fulfils both functions. It emits a compensation signal in the form of (visible or invisible) light into the second transmission path 230, which has an optical coupling 231. The light is received by the receiver after traversing transmission path 230. Compensation light source 3 is thus supplied by controllable compensation current source 10 and by basis coupling current source 15. The control currents for basis coupling current source 15 are added together in an adder 18 and forwarded together to compensation light source 3. Since the two currents are phase-offset, a superimposed control current is produced.

The compensation control current is used to adjust the working point when no measured object if present before measuring arrangement 1. It depends only on the electro-optical basis coupling, and accordingly is only adjusted by the basis coupling control current. This system has many advantages, since a predefinable, controllable electro-optical basis coupling 231 is used between emitted light source 2 and receiver diode 4 or photodiode 5 instead of a purely optical basis coupling.

The measuring arrangement shown above yields the following basic equation reflecting the ratio between compensation control current $I_C$ and emission control current $I_S$, with the condition that the purely optical basis coupling $D_{SG}$ 222 is much smaller than the electro-optically generated basis coupling $D_{EOGK}$ 231:

$$\frac{I_c}{I_s} = \frac{\eta_s}{\eta_c} \cdot \frac{D_{SF} + D_{EOGK}}{D_c}$$

In this context, $\eta_S$ or $\eta_C$ are the respective efficiencies of emitted light source 2 and compensation light source 3. $D_{SF}$ is the functional optical coupling to be determined in transmission path 220 by measured object 13. It corresponds to the transmission property of transmission path 220 that is to be measured. $D_C$ is the (constant) optical compensator coupling in second transmission path 230. $D_{EOGK}$ is the electro-optically generated basis coupling.

Based on the further assumption that $\eta_S$ is the same as or approximately the same as $\eta_C$, the equation is simplified to:

$$\frac{I_c}{I_s} = \frac{D_{SF} + D_{EOGK}}{D_c}$$

$D_{EOGK}$ thus defines the resting working point of the controller, and accordingly to a substantial degree the sensitivity of the sensor.

Figure 2:
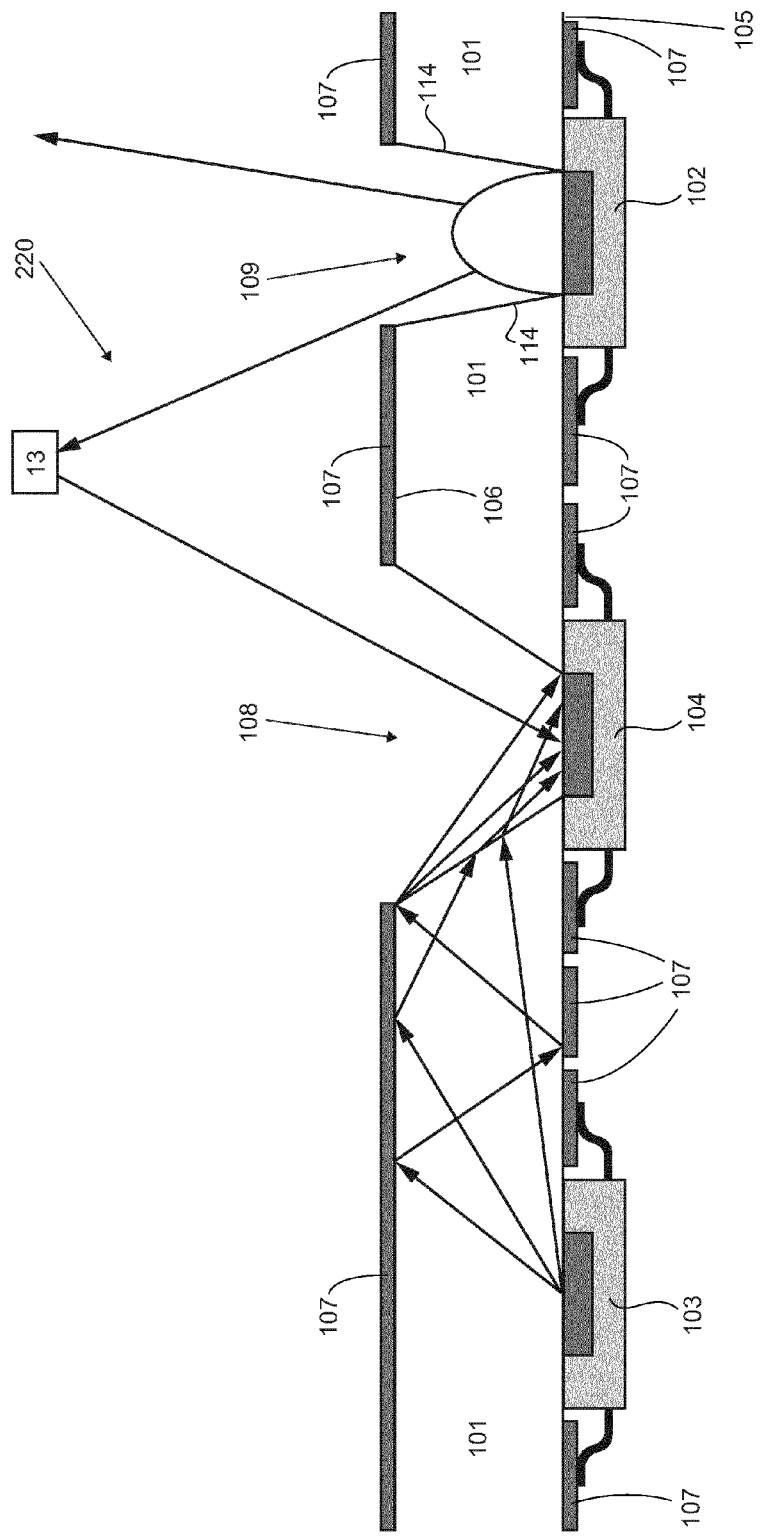
FIG. 2 shows a first embodiment of an opto-electronic measuring arrangement according to this disclosure, in which a transmitter, a receiver and a compensation light source are arranged in reverse assembly.

FIG. 2 shows a technical implementation of an optoelectronic measuring arrangement according to this disclosure. This is explained using the example of a sensor system with electro-optical basis coupling as described above. For the sake of clarity, the necessary control unit and other actuation and power components are not shown. Of course, the emission of a clocked emitted or compensation signal is optional, not essential.

The configuration shown is of the measuring arrangement with a printed circuit board 101, an emission LED 102, which is emitted light source 2, a compensation LED 103, which is compensation light source 3, and a receiver diode 104, which represents receiver unit 4 or photodiode 5. The use of LEDs as light sources is known from the prior art and has a number of advantages. For example, they can emit IR radiation. Of course, other light sources may also be configured. Accordingly, in the simplest case receiver diode 104 is the receiver (receiver unit) 4 itself.

According to FIG. 2, the emission LED 102, compensation LED 103 and receiver diode 104 components are mounted on printed circuit board 101 in a "reverse assembly". The components are preferably all arranged on the same side of printed circuit board 101, preferably on an underside 105 of printed circuit board 101. Both underside 105 and upper side 106 of printed circuit board 101 are coated with a layer of copper. Upper side 106 is preferably coated as extensively as possible with a copper layer 107 in the area of compensation LED 103, and preferably also in the region of receiver diode 104. The corresponding conductor paths and signal paths are preferably also arranged on underside 105 of the printed circuit board. The copper layer is discontinuous in places. Hereafter, the copper coating or another metallic, conductive coating will be explained using the example of a copper layer 107. Of course, other (metallic) layers or coatings that are not transparent for the optical radiation used may also be implemented. In the description, conductor paths or signal paths are also designated as copper layer 107 for the sake of simplicity.

Printed circuit board 101 consists of a glass fiber reinforced polymer, preferably an epoxy resin, particularly preferably FR4 material, and in all cases comprises glass fiber elements. It is used as an optical system to conduct the radiation emitted by compensation LED 103 to receiver diode 104. The electro-optical basis coupling between compensation LED 103 and receiver diode 104 is assured thereby. The emitted light radiation is transported inside the printed circuit board material, and is prevented from escaping to the outside by the coatings with the copper layer 107 on the outer sides (underside 105 and upper side 106). In this way, radiation is prevented from reaching measured object 13 and from there being directed to receiver diode 104 after reflection. In this way, a coupling between compensations LED 103 and measured object 13 is (almost totally) prevented.

In one embodiment, receiver 104 is arranged on the underside of printed circuit board 101. In this context, receiver 104 is located below a through-hole 108, which passes through the entire printed circuit board 101, particularly the thickness thereof. In the area of receiver diode 104, printed circuit board 101 has a through-hole 108, which may be constructed as a cylindrical hole or as a countersunk point, in order to receive a light radiation, for example infrared radiation (IR radiation) returned from a measured object 13 arranged above the upper side 106. Through-hole 108 is preferably a conical hole with an opening angle not greater than 120°, preferably not greater than 90°, particularly preferably not greater than 60° and most preferably not greater than 45°. Particularly preferred is an opening angle of 90°. The opening angle is preferably facing away from the receiver (4, 104); thus, the hole becomes wider towards the side facing away from the receiver. Depending on the embodiment of receiver diode 104, it may lie flush with hole 108 or it may protrude into hole 108.

An emission through-hole 109 is arranged above emission LED 102, and is preferably cylindrical. However, this hole may also be created by countersinking and may have an opening angle that is preferably between zero and 150 degrees, particularly preferably about 90 degrees. The inside of emission through-hole 109 is preferably covered with a coating 114, so that light emitted by emission LED 102 is radiated through printed circuit board 101 but does not get inside the printed circuit board. In this way, direct coupling between emission LED 102 and receiver diode 104 through printed circuit board 101 is prevented. A purely optical basis coupling between the transmitter (emitter) and the receiver does not occur, because this is replaced by the electro-optical basis coupling, which is carried out by compensation LED 103.

Copper layer 107 on underside 105 of printed circuit board 101 is correspondingly exposed in the area of compensation LED 103. In this way, the light radiation by compensation LED 103 is able to penetrate printed circuit board 101 most effectively. The light is guided inside printed circuit board 101 by the outer layers of copper on upper side 106 and underside 105, and thus reaches receiver diode 104 after corresponding damping and scattering by the printed circuit board material. The desired electro-optical basis coupling between emission compensation LED 103 and receiver diode 104 may thus be created by suitable adjustment.

Consequently, the compensation radiation from compensation LED 103 and the reflected radiation that is reflected by a measured object 13 outside of printed circuit board 101 are superimposed on each other at receiver diode 104 (receiver) after measured object 13 has been illuminated with infrared radiation or light from emission LED 102.

Figure 3:
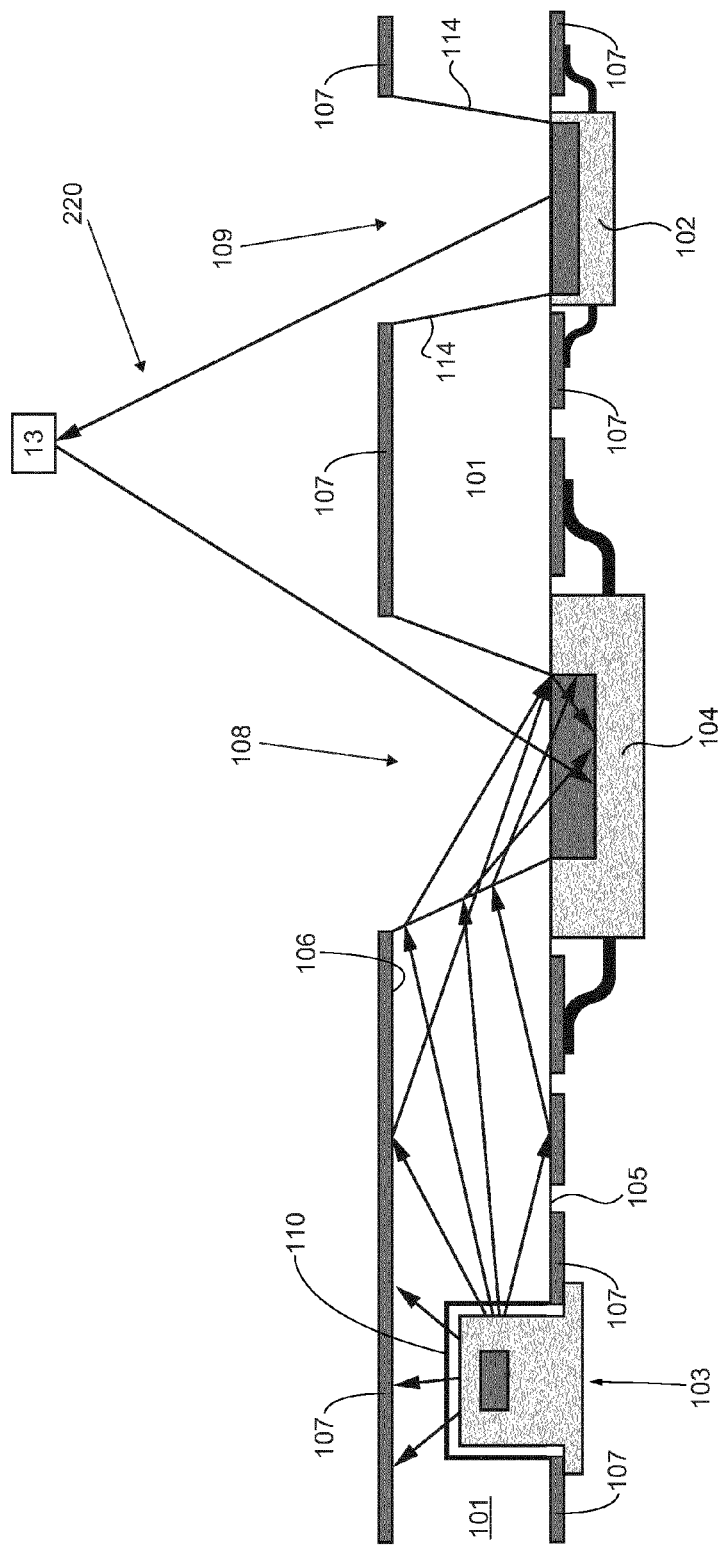
FIG. 3 shows a further embodiment of the opto-electronic measuring arrangement with a printed circuit board in which the compensation light source protrudes partly into the printed circuit board.

The coupling between compensation LED 103 and receiver diode 104 may be improved if compensation LED protrudes at least partly into printed circuit board 101. As is shown in FIG. 3, a blind borehole or blind hole 110 is provided for this purpose in printed circuit board 101, and into which the radiation from compensation LED 103 is emitted.

The copper layer (Cu) on the upper side 106 of printed circuit board 101 (PCB) opposite blind hole 110 is continuously closed at this point, so that no (optical) radiation from compensation LED 103 reaches measured object 13, and thus also cannot be influenced thereby.

Even with simple printed circuit boards having only two copper layers (doublelayer printed circuit board), one of the layers is usually designed as a ground layer. In the case of a multilayer printed circuit board, at least one side of the printed circuit board 101 is designed with a copper layer 107 that is closed over as large an area as possible, and which in any case serves as the ground layer, and is used for example as an electrical shield for the purpose of increasing the resistance to interference of circuit or printed circuit board 101, and for EMC considerations. Consequently, the expense is not increased thereby, and copper layer that is present in any case is used for optical shielding. The copper surface 107 is also closed over a very large area on the underside 105 of the printed circuit board as well, so that this too functions as a "mirror" for IR radiation in the area between compensator 103 and the photodiode (receiver diode 104). Consequently, a kind of optical waveguide is created inside printed circuit board 101, in other words printed circuit board 101 itself forms an optical waveguide.

In the configuration shown here, compensation LED 103 does not protrude into printed circuit board 101, but lies flush against the PCB underside 105 (as for example in the case of a SFH4257R type diode by Osram, used in tests) and radiates into the FR4 material of printed circuit board 101 through a correspondingly exposed area in lower copper coating 107.

The compensation thus does not require any additional installation space above printed circuit board 101, which in turn enables very thin coverings (small optical emitter basis coupling—high sensitivity/range) among other advantages. Moreover, photodiode/receiver LED 104 may also be shielded optically from parasitic infiltration by (scattered) light if necessary by means of a shield plate that is often present anyway for EMC reasons, and very effectively shielded optically from emitter LED 102 and compensation LED 103 by the rear 105 of the PCB.

All reverse type photodiodes (PD) are suitable for use as the receiver. Depending on the application, the PD may receive both the IR radiation from the object to be measured and the compensation radiation through a simple (cylindrical) borehole, or also through a countersunk point. Besides a simple borehole, a conical hole with an opening angle of at least 5°, preferably at least 20°, 30°, 45°, 60°, 90° or 120° is preferred. An opening angle of at least 10° is particularly preferred. The conical borehole is preferably arranged in such a manner that the compensation light (light from the compensator), the extraneous light (stray light) and the useful signal light (the light that is emitted by emitter 102 and is reflected from an object 13) reach receiver 104 at practically the same point, particularly at the photosensitive chip surface of the photodiode.

The dependency of the optical compensator coupling as a function of distance and a number of other boundary conditions (vias, with/without countersunk point, peripheral region on the printed circuit board, among others) with the given IR components was investigated with respect to a two-layer test circuit board. Two critical dependencies were revealed with the given FR4 printed circuit board material: the thickness of the circuit board and the distance preferably to be maintained between the compensation light source and the receiver. It was found that as the printed circuit board becomes thicker so the optical conducting property improves and accordingly more of the compensation signal reaches the receiver and the distance between the compensator and the receiver may or must also be correspondingly greater. With relatively thin boards, particularly if the compensator does not protrude into a bore hole but is arranged flat on the PCB, the distance between compensator and receiver must be relatively small (for example, less than 20% of the distance stated above).

This disclosure enables compensation to be provided in known HALIOS sensors, that is to say sensors without a dedicated (stand-alone) light conductor, and without imposing pertinent technical requirements and/or conditions on the optomechanics of a sensor cover. Ultimately, this enables the design of more compact, particularly flatter, and simpler (and thus less expensive) HALIOS sensors than was possible hitherto.

In one embodiment, compensation LED 103 is at least partly integrated in pocket borehole 110 (such as in the case of a HT-260IRPJ type diode manufactured by Harvatek). Compensation LED 103 is preferably incorporated entirely or almost entirely in pocket borehole 110.

Referring to FIG. 3, it becomes clear how the light radiation emitted by compensation LED 103 is reflected on the copper layers 107 of the upper side 106 and underside 105. When leaving the FR4 material of printed circuit board 101 and passing into receiver through-hole 108, the radiated light is scattered in such a manner that the beams reach receiver diode 104 with sufficient intensity and can be reliably reproduced. The emission of the beam from compensation LED 103 through opening 108 toward an object to be measured 13 that is arranged above the upper side 106 of printed circuit board 101, is so small as to be negligible, and it is insignificant for all practical purposes within a few centimeters from opening 108.

It is clear that receiver diode 104 receives more than just the emission from compensation LED 103. The radiation that is emitted by emitter LED 102 and reflected by the object to be measured 13 is superimposed in the same sensitive area of receiver diode 104.

Figure 4:
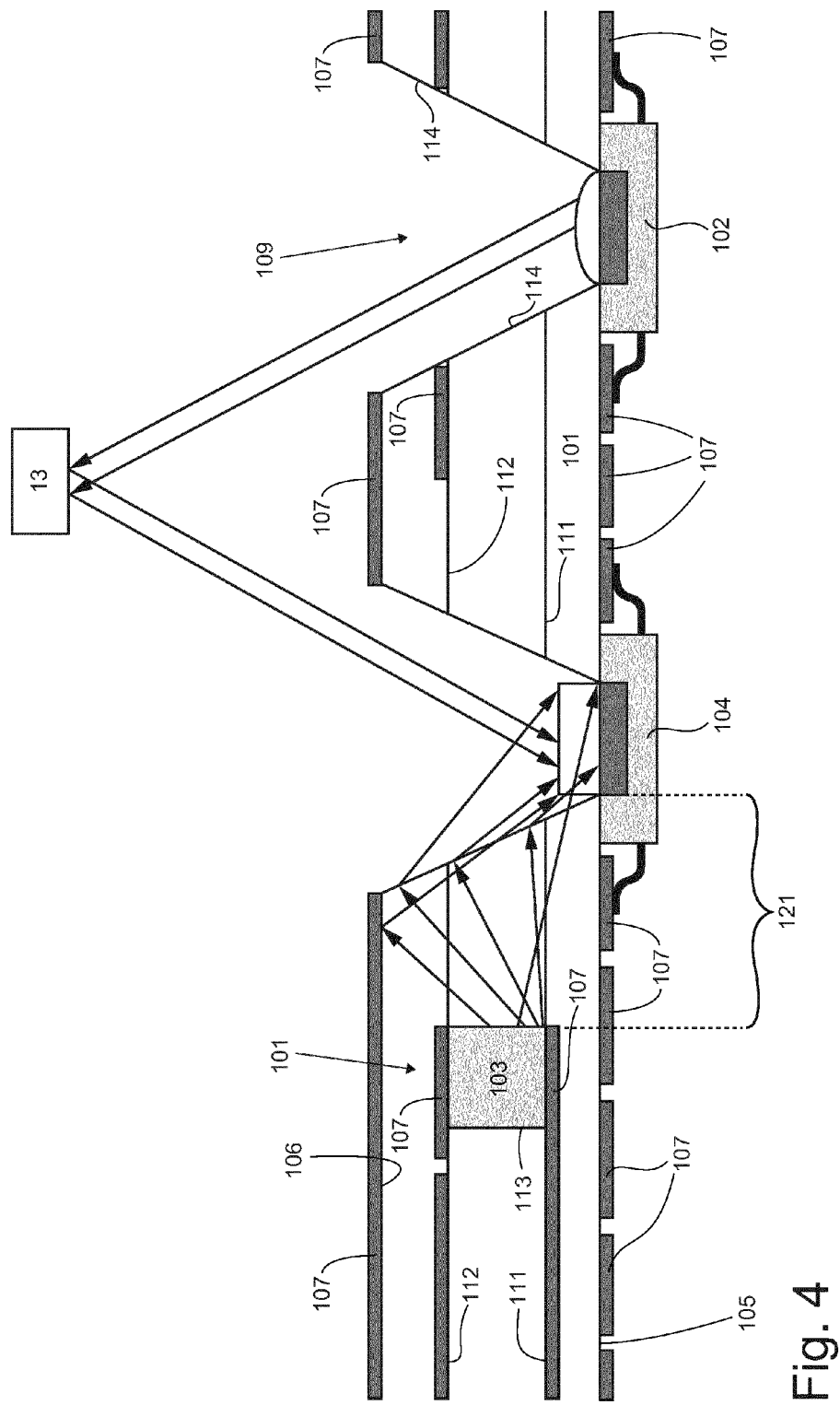
FIG. 4 shows a measuring arrangement with a multilayer printed circuit board fully integrated compensation light source.

FIG. 4 shows an embodiment of the opto-electronic measuring arrangement according to this disclosure with a four-layer printed circuit board 110. A cavity 113 is provided between the two inner layers 111, 112, in which cavity the compensation LED 103 or the compensator is accommodated. Inner layers 111 and 112 are designed such that the light emitted by compensation LED 103 can be guided to receiver diode 104. In the embodiment shown, the inner layer (inner layer 111) does not have a copper layer 107 in the area 121 between the compensation light source or compensation LED 103 and the receiver or receiver diode 104. There is also no other metallisation or light-impermeably layer provided in this area 121. In this way, it is ensured that emitted light radiated by compensation LED 103 reaches receiver diode 104. The emitted radiation is guided in the optical system printed circuit board, since the glass fiber elements of the printed circuit board material, e.g., FR4 material, guarantee sufficiently good optical guidance. The scattering that arises in the material does not have a negative effect on the system, on the contrary, the diffusion ensures the desired homogeneous (even) illumination of the sensitive region of the receiver diode (e.g., photodiode), thereby enhancing sensor reproducibility.

With a printed circuit board having multiple copper layers (inner layers), the copper coating on inner layers 111, 112 is typically recessed as far as possible in area 121 between compensation LED 103 and receiver LED 104 in order to ensure the best possible transmission. All other light-blocking elements (vias, boreholes, etc.) should preferably be absent from this area.

In the embodiment according to FIG. 4, it is shown that emission through-hole 109 also has an opening angle that is flared toward upper side 106 of printed circuit board 101. This makes it possible for the emitter to illuminate a larger area directly in front of printed circuit board 101. Consequently, gestures can still be recognized correctly close to the sensor.

Figure 5:
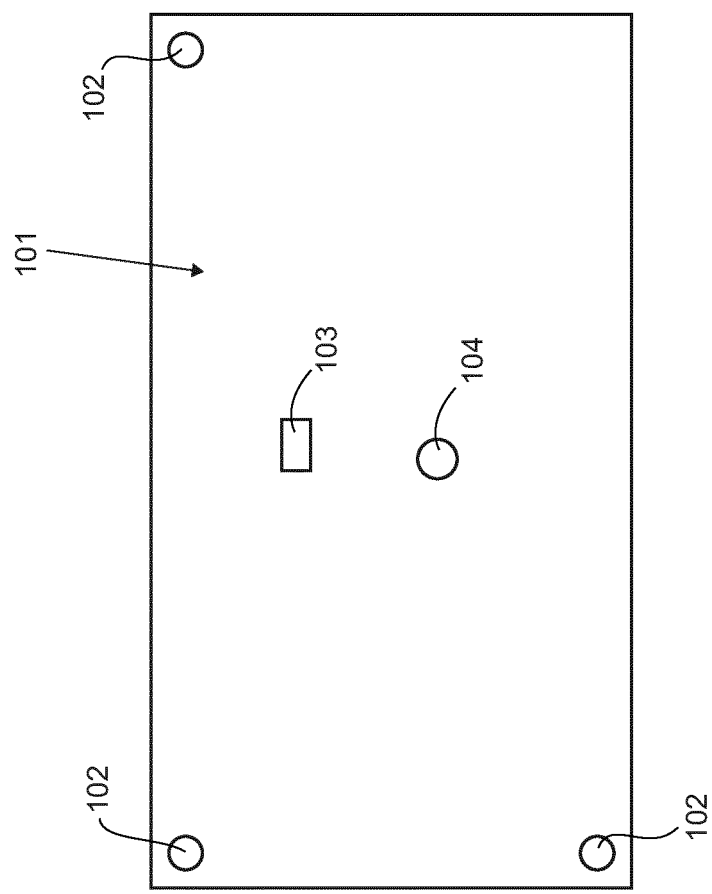
FIG. 5 is a top view of a printed circuit board with transmitter, receiver and compensation light source.

FIG. 5 shows a top view of a printed circuit board 101 of the measuring arrangement according to this disclosure. A plurality of emitter LEDs 102 are arranged in three corners of printed circuit board 101. The evaluation of the signals from spatially separate emitters not only enables the presence of objects to be detected in front of or above printed circuit board 101, but also movements, the direction of such movements, simple changes in distance, approaches, gestures generally or similar to be effected.

Receiver diode 104 is preferably arranged in an area in the middle of printed circuit board 101, so that the distance thereof from the three emitter LEDs is similar, and preferably identical if possible. Of course, receiver diode 104 may also be positioned somewhere else. In such asymmetrical arrangements, adjustment for the differing distances between the receiver diode and the individual emitter LEDs is preferably made in the controller.

Compensation LED 103 is preferably arranged closer to receiver diode 104 than the emitter LEDs 102.

In the context of this disclosure, it has been found that, particularly for a printed circuit board thickness between 1 mm and 2 mm (e.g., 1.55 mm) the compensation diode or compensation LED 103 is preferably positioned at a distance of at least 5 mm, particularly preferably at least 7 mm from the receiver or receiver diode 104. It has also been found that the distance between the two elements is preferably not more than 15 mm, particularly preferably not more than 10 mm, very preferably not more than 9 mm. However, this distance information varies according to the diode type, the material and the thickness of the printed circuit board 101, as explained in the foregoing.

While exemplary embodiments have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An opto-electronic measuring arrangement, comprising:
   a transmitter, a compensation transmitter, and a receiver for measuring the transmission properties of a first transmission path between the transmitter and the receiver, wherein:
     the transmitter emits an emission signal along the first transmission path, the emission signal being detected by the receiver after the emission signal has traversed at least a part of the first transmission path;
     the compensation transmitter emits a compensation signal along a second transmission path, the compensation signal being detected by the receiver after the compensation signal has completed the second transmission path; and
     the receiver is configured to superimpose the emission signal and the compensation signal in a linear manner and to form a receiver output signal therefrom; and
   a control unit that generates a compensation control signal from the receiver output signal for actuating the compensation transmitter and/or a transmitter control signal for actuating the transmitter for feedback-controlled adjustment of the receiver output signal such that the receiver output signal remains substantially unchanged if the transmission properties of the first transmission path are changed;
   wherein coupling of optical signals between the compensation transmitter and the receiver is performed at least partially via an optical system in a printed circuit board on which the compensation transmitter and the receiver are arranged.

2. Opto-electronic measuring arrangement according to claim 1, wherein the second transmission path comprises the optical system in the printed circuit board.

3. Opto-electronic measuring arrangement according to claim 1, wherein the optical coupling between the compensation transmitter and the receiver takes place mostly or entirely via the optical system in the printed circuit board.

4. Opto-electronic measuring arrangement according to claim 1, wherein the optical system is a compensating, optical light conductor system.

5. Opto-electronic measuring arrangement according to claim 1, wherein the compensation transmitter is at least partly integrated in the printed circuit board.

6. Opto-electronic measuring arrangement according to claim 1, wherein the printed circuit board is a multilayer printed circuit board and the compensation transmitter is integrated in one of the inner layers.

7. Opto-electronic measuring arrangement according to claim 6, wherein the inner layers have no metallizing between the compensation transmitter and the receiver.

8. Opto-electronic measuring arrangement according to claim 1, wherein the compensation transmitter is mounted on the printed circuit board in reverse assembly and emits light into the printed circuit board through a cutaway in an outer copper layer.

9. Opto-electronic measuring arrangement according to claim 1, wherein the receiver is arranged below a through-hole on the underside of the printed circuit board.

10. Opto-electronic measuring arrangement according to claim 9, wherein the through-hole is cylindrical or conical.

11. Opto-electronic measuring arrangement according to claim 9, wherein the through-hole has an opening angle facing way from the receiver not greater than 120°.

12. Opto-electronic measuring arrangement according to claim 11, wherein the opening angle facing away from the receiver is not greater than 90°.

13. Opto-electronic measuring arrangement according to claim 12, wherein the opening angle facing away from the receiver is not greater than 45°.

14. Opto-electronic measuring arrangement according to claim 1, wherein the printed circuit board is formed of a glass fiber reinforced polymer.

15. Opto-electronic measuring arrangement according to claim 14, wherein the glass fiber reinforced polymer comprises a glass fiber reinforced epoxy resin.

16. Opto-electronic measuring arrangement according to claim 15, wherein the resin comprises FR-4 material.

17. Opto electronic measuring arrangement according to claim 15, wherein the resin is at least partly covered with a metallic layer.

18. Opto-electronic measuring arrangement according to claim 1, wherein the compensation transmitter is at a distance of at least 5 mm from the receiver.

19. Opto-electronic measuring arrangement according to claim 1, wherein the compensation transmitter is at a distance of at least 7 mm from the receiver.

20. Opto-electronic measuring arrangement according to claim 1, wherein the compensation transmitter is at a distance of at least 15 mm from the receiver.

21. Opto-electronic measuring arrangement according to claim 1, wherein the inside of a through-hole for the transmitter is metallized.

22. Opto-electronic measuring arrangement according to claim 21, wherein the inside of the through-hole is covered with a copper layer.

23. Opto-electronic measuring arrangement according to claim 1, wherein the distance between the transmitter and the receiver is greater than the distance between the compensation transmitter and the receiver.

24. Opto-electronic measuring arrangement according to claim 1, wherein:
the transmitter and the compensation transmitter emit light time-sequentially and in a phased manner, wherein the emitted light is phase-shifted;
the measuring arrangement comprises a clock generator for generating a clock signal, a demodulator for synchronous evaluation of the receiver output signal, a controllable current source for generating a clocked transmitter control current for the transmitter and a controllable compensation current source for generating a clocked compensation control current for the compensation transmitter; and
the controller unit for generating at least one actuation signal for the controllable current source and/or the compensation current source is constructed such that the light intensity of the compensation transmitter and/or the transmitter is controllable in the amplitude thereof by adjusting the compensation control current and/or the transmitter control current in such a manner that the synchronous signal difference arising between the different phases becomes zero.

25. Opto-electronic measuring arrangement according to claim 24, wherein the emitted light is phase-shifted respectively by 180°.

* * * * *